United States Patent [19]
Emery et al.

[11] Patent Number: 5,175,396
[45] Date of Patent: Dec. 29, 1992

[54] LOW-ELECTRIC STRESS INSULATING WALL FOR HIGH VOLTAGE COILS HAVING ROEBELED STRANDS

[75] Inventors: Franklin T. Emery, Orlando; Leonard B. Simmonds, Winter Springs, both of Fla.

[73] Assignee: Westinghouse Electric Corp., Pittsburgh, Pa.

[21] Appl. No.: 627,277

[22] Filed: Dec. 14, 1990

[51] Int. Cl.⁵ .................... H01B 7/34; H02K 15/12
[52] U.S. Cl. ..................... 174/36; 174/120 SC; 310/45; 310/208; 310/213; 310/215
[58] Field of Search ............... 310/43, 45, 213, 208, 310/215; 174/33, 36, 120 SC; 336/186, 187; 427/116, 117

[56] References Cited

U.S. PATENT DOCUMENTS

| | | | |
|---|---|---|---|
| 2,705,292 | 3/1955 | Wagenseil | 310/213 UX |
| 3,327,050 | 6/1967 | Barrie | 174/120 SC UX |
| 3,329,764 | 7/1967 | Tanges, Jr. | 174/120 SC |
| 3,576,387 | 4/1971 | Derby | 174/36 |
| 4,308,476 | 12/1981 | Schuler | 310/45 |
| 4,314,737 | 2/1982 | Bogese | 174/36 |
| 4,403,163 | 9/1983 | Amerding | 310/213 |
| 4,510,077 | 4/1985 | Elton | 252/502 |
| 4,602,180 | 7/1986 | Olson | 310/215 |
| 4,724,600 | 2/1988 | Studniarz | 310/45 |
| 4,853,565 | 8/1989 | Elton | 310/45 |
| 4,988,949 | 1/1991 | Boenning | 174/120 SC |
| 5,036,165 | 7/1991 | Elton et al. | 174/102 |
| 5,066,881 | 11/1991 | Elton et al. | 310/213 |
| 5,067,046 | 11/1991 | Elton et al. | 361/220 |

FOREIGN PATENT DOCUMENTS

| | | |
|---|---|---|
| 0036911 | 7/1981 | European Pat. Off. . |
| 1053090 | 3/1959 | Fed. Rep. of Germany ...... 174/120 SC |
| 2851388 | 5/1979 | Fed. Rep. of Germany ........ 174/36 |
| 2293816 | 7/1976 | France . |
| 2489054 | 2/1982 | France . |
| 1-152939 | 6/1989 | Japan . |
| 0765420 | 1/1957 | United Kingdom ......... 174/120 SC |

OTHER PUBLICATIONS

"Prepegs for Pre-Consolidation of Coils for High Voltage Machines"; Jan. 1987; Isovolta (4 pages).

*Primary Examiner*—R. Skudy
*Attorney, Agent, or Firm*—M. G. Panian

[57] ABSTRACT

A wall structure for insulating the exterior surface of a high voltage coil having Roebeled windings is provided that comprises an inner insulating layer formed from a hardenable epoxy material for surrounding the coil and filling void spaces on the surface of the coil created by the Roebeled windings, a ground wall layer surrounding the inner layer for grounding the wall structure, and a semiconductive layer formed from a carbon filled epoxy material integrally molded around the outer surface of the inner insulating layer for reducing the electric stress across the insulating layer and in particular across any voids remaining after the insulative layer has been applied over the Roebeled windings on the exterior of the coil. The improved wall structure advantageously increases the lifespan of high voltage coils by reducing the electric stress across the inner moulding layer, thereby reducing the probability that damaging electric arcing will ever occur in any void spaces present in this layer.

17 Claims, 7 Drawing Sheets

LOW-ELECTRIC STRESS INSULATING WALL FOR HIGH VOLTAGE COILS HAVING ROEBELED STRANDS

BACKGROUND OF THE INVENTION

This invention generally relates to insulators for covering a high voltage component having an irregular surface, and is specifically concerned with an insulating wall structure for covering a high voltage coil having Roebeled strands on its outer surface that tend to create unwanted void spaces in the insulating material forming the wall.

Wall structures for insulating the high voltage coils used in power-producing alternators are known in the prior art. Such wall structures are made after the coil strands have been consolidated into a coil stack by applying strips of a material treated with an insulative, thermosetting epoxy over the top and bottom surfaces of the coil stack. The coil and the strips of epoxy-treated material are then placed within a heatable press assembly which simultaneously heats and compresses the strips of epoxy-treated material which causes them first to liquefy and to fill the space between the irregular surfaces on the coil exterior, and then to harden. A mica tape ground wall is formed around the consolidated coil and vacuum impregnated with an epoxy resin. The ground wall is completed by applying a conductive varnish over the impregnated mica tape. The resulting insulated coil is then assembled within a power-generating alternator.

In order to minimize the losses which would occur in these coils as a result of unwanted eddy currents, the windings of these coils are intertwined in a braid-like form known as a Roebel bar. The outer surfaces of such Roebel bars are highly discontinuous, as the relatively thick and flat strands do not smoothly align with one another on the same plane on the surface of the coil, but instead disjointedly overlap. The surface discontinuities presented by the twisted and overlapping Roebeled strands tends to create a number of air gaps in the outer surface of the coil (known as "void spaces" in the art) which provide potential sites for unwanted arcing if each such gap is not completely filled with insulating material.

Unfortunately, the prior art technique of applying hardenable, melted epoxy material under pressure to the outer surface of such coils does not always completely succeed in filling all of the arc-inducing voids around the outer surface of the high voltage coils. Consequently, in many of these coils, air bubbles remain in the epoxy insulating material after it hardens under pressure. These air bubbles can form sites of electric discharges when the coils are operated at their normal voltages of around 20 kilovolts, and experience has shown that even small amounts of arcing in a relatively few number of void spaces can severely curtail the expected 40 year life span of such coils to less than 20 years.

Clearly, there is a need for a new technique of applying an insulating wall around high voltage coils having Roebeled strands on their outer surfaces which is more effective in eliminating the presence of any void spaces between the windings of these coils. Ideally, such a wall structure should be capable of not only reducing the number of such spaces, but of further reducing the electrical stresses which occur within these voids. Finally, it would be desirable if the fabrication of such a new and improved wall structure were compatible with previous manufacturing devices and techniques, so that the manufacturing facilities for such structures would not have to be completely replaced.

SUMMARY OF THE INVENTION

Generally speaking, the invention is an improved wall structure for insulating the exterior surface of a high voltage component that comprises an inner layer formed from an insulating material disposed over the surface of the component, an outer ground wall for grounding the wall structure, and a layer of semiconductive material for reducing the electric stress across the inner insulating layer. The semiconductive layer is preferably disposed between the outer surface of the inner insulating layer, and the inner surface of the ground wall. The improved wall structure may further comprise a connection means between the high voltage component and the layer of semiconductive material to further lower the electric stress over the inner insulating layer.

The insulating wall structure of the invention is particularly adapted for use on a high voltage coil having Roebeled strands on its outer surface. When the invention is applied to such a coil, the inner insulating layer is preferably formed from a hardenable, nonconductive material such as epoxy which is effective in filling void spaces on the surface of the component which arise as a result of the irregular geometry of the Roebeled strands. Additionally, the semiconductive layer is likewise preferably formed from a hardenable material such a carbon-filled epoxy so that both the insulating layer and the semiconductive layer can be integrally molded into a single strong wall structure. The semiconducting properties of the semiconductive layer effectively reduces the electric stress across the inner insulating layer, and in particular across any small pockets of air which might be present in the insulating layer as a result of the failure of the hardenable epoxy to completely fill all of the numerous void spaces present on the coil. The invention is particularly applicable to coils having Roebeled strands which are operated at between 20 and 24 kilovolts. Under such operating conditions, the resistance of the semiconductive material forming this semiconductive layer may be between about 5,000 and 50,000 ohms per square, and is preferably on the order of between 8,000 and 20,000 ohms per square.

The invention further contemplates a method for forming an insulating wall structure around an electrical component such as a high voltage coil having Roebeled strands on its exterior that applies only a small amount of electric stress to its insulating layer. In this method, a hardenable, insulating material such as epoxy is liquefied and then applied around the outer surface of the component under pressure to fill void spaces created by the presence of the Roebeled strands. At the same time, a hardenable, semiconductive material such as carbon-filled epoxy is applied around the outer surface of the insulating layer so that both the inner insulating layer and the semiconductive layer harden together to form a single, integral wall structure.

BRIEF DESCRIPTION OF THE SEVERAL FIGURES

Figure 1:
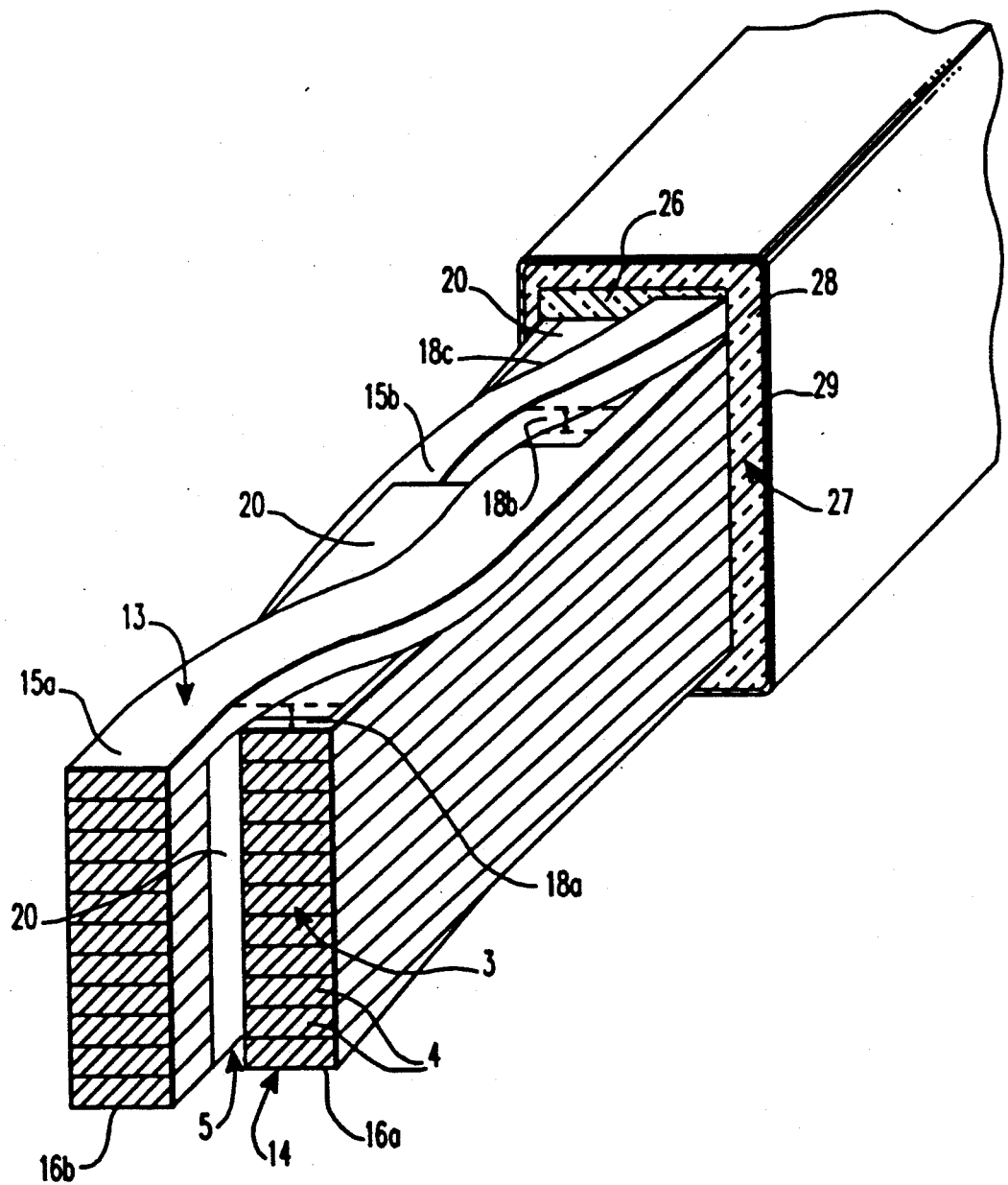
FIG. 1 is a perspective view of a coil section having Roebeled windings on its top and bottom ends that is insulated by means of a prior art insulating wall structure.
Figure 6A:
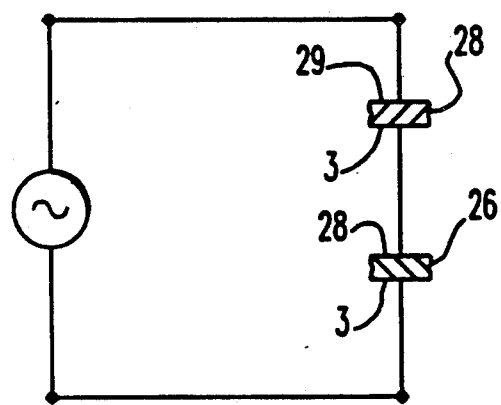
Figure 6B:
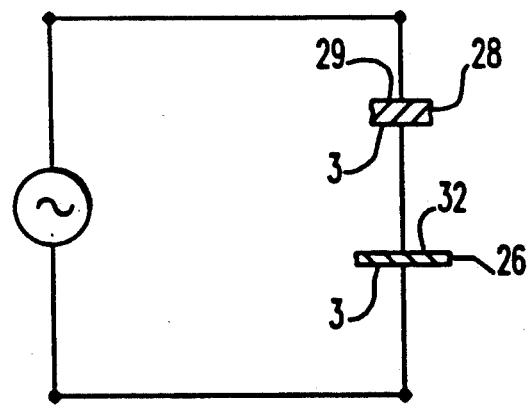
Figure 7:
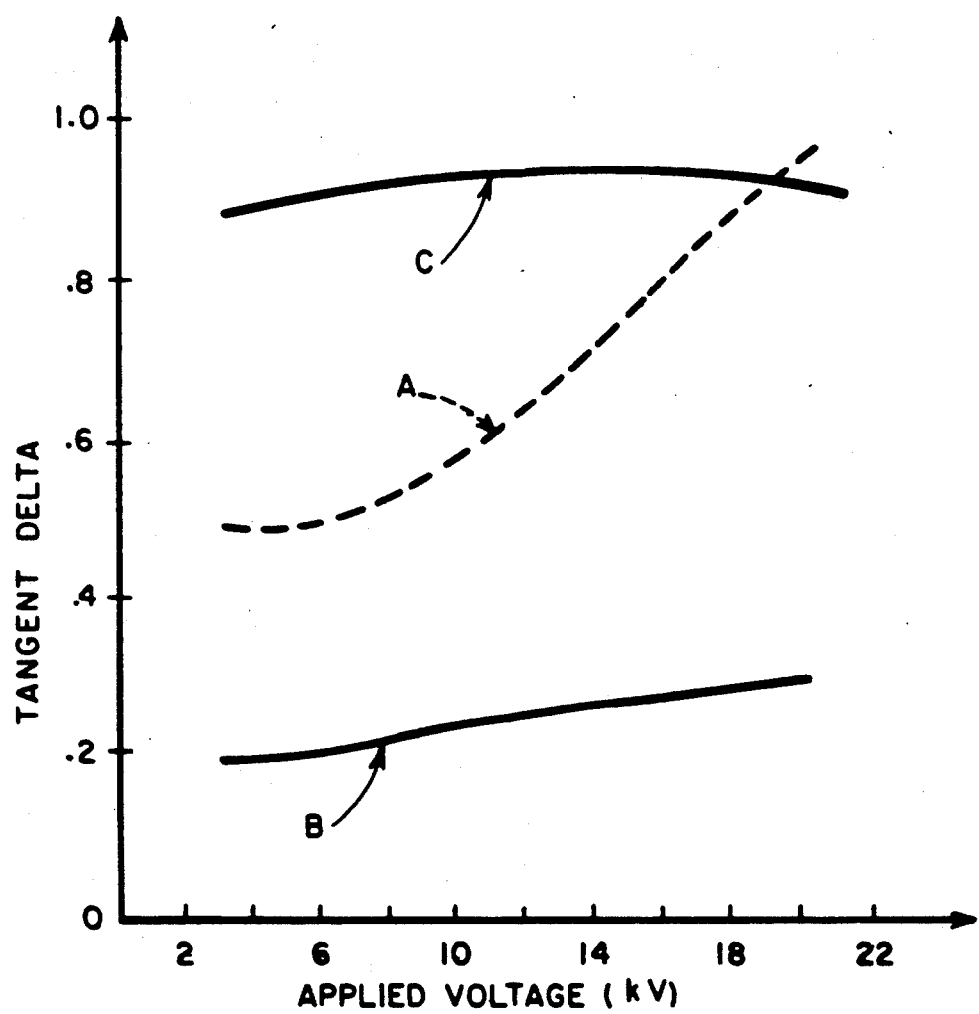

FIGS. 6A and 6B are schematic diagrams illustrating how the semiconductive layer of the insulating wall of the invention increases the capacitance between the outer surface of the array of high voltage strands and the outer surface of the inner insulating layer, and thereby lowers the electric stress applied to the inner insulating layer, and FIG. 7 is a graph comparing how the electric stress applied across an insulating wall structure increases with voltage for both the prior art coil section illustrated in FIG. 1 (which is shown in dotted lines), and the improved insulating wall structure of the invention (shown in solid lines).

DETAILED DESCRIPTION OF THE PREFERRED EMBODIMENT

Figure 2:
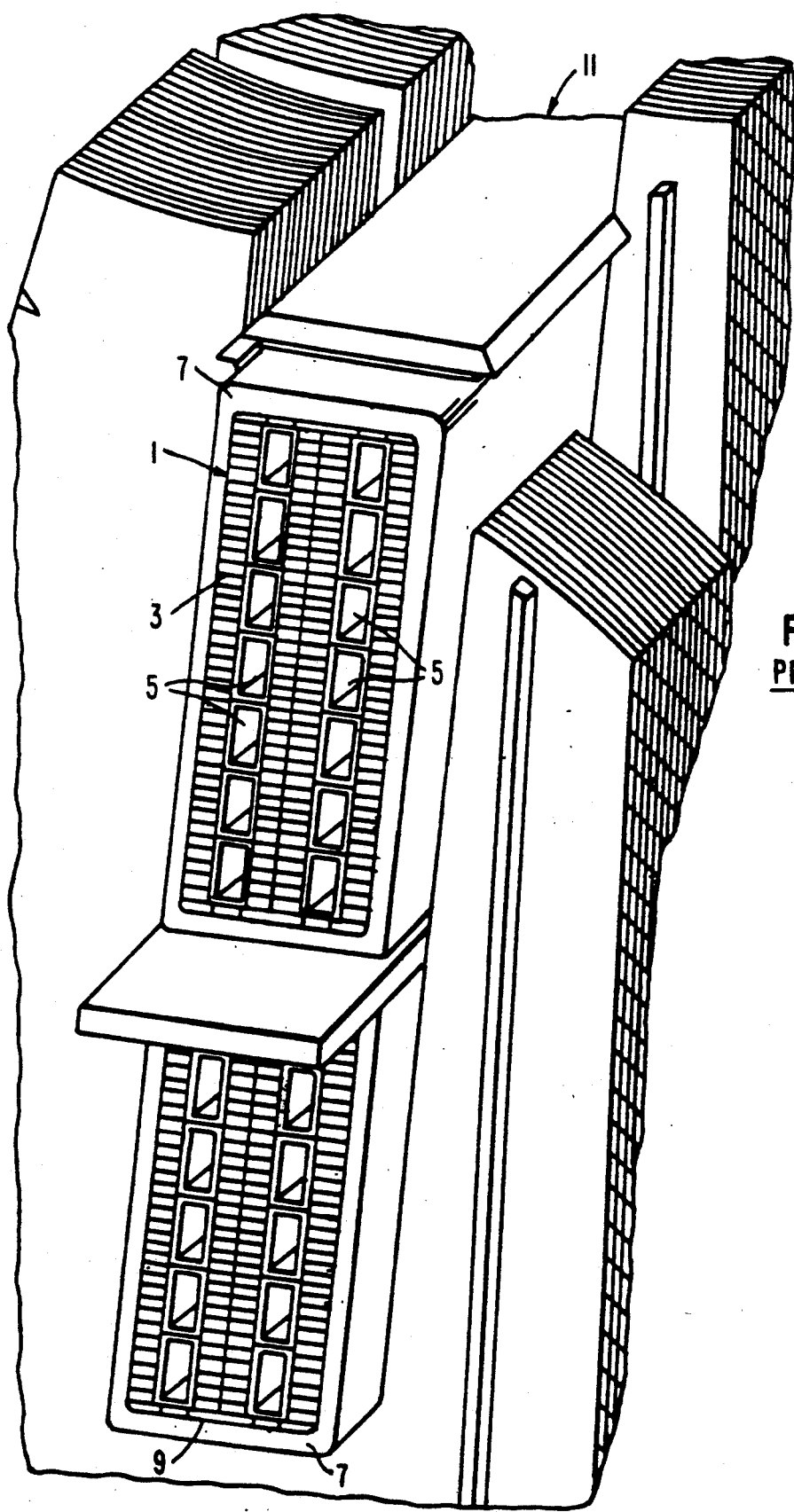
FIG. 2 illustrates how the coil section shown in FIG. 1 fits within the slots of the stator assembly of an alternator.

With reference now to FIGS. 1 and 2, wherein like numerals designate like components throughout all the several figures, the purpose of the invention is to provide an insulating wall structure for a high voltage component, such as a high voltage coil section 1 of the type used is power-generating alternators. Such coil sections 1 include an array 3 of consolidated copper strands 4, each of which is generally rectangular in cross section. In the array 3, these strands 4 are arranged in rows and columns. Such strand arrays 3 include one or more ventilation passageways 5 which conducts a heat-dissipating gas, such as hydrogen, during the operation of the coil section 1 in an alternator or other electro-dynamic machine. In the strand array 3 illustrated in FIG. 1, this ventilation passageway 5 is located between two stacked columns of strands 4 as shown. Such passageway typically houses a ventilation tube (not shown). Such ventilation passageways may, in the alternative, be incorporated in some of the strands 4 themselves. The array 3 of coil strands 4 is normally completely covered by an insulating wall structure 7, shown in cross section near the rear portion of the perspective view of the coil section 1 illustrated in FIG. 1.

While the insulating wall structure of the invention may be advantageously used in conjunction with any one of a number of high voltage components, it is particularly adapted for use with a high voltage coil section 1 of the type used in power-generating alternators. Such coil sections 1 are, in operation, mounted within the slots 9 of the stator assembly 11 of such an alternator (see FIG. 2). In order to maximize the efficiency of such power-generating alternators, it is important to eliminate or at least reduce the amount of unwanted eddy currents flowing through the array 3 of copper strands 4 that forms each of these coil sections 1. Accordingly, the strands on the top and bottom ends 13,14 are "braided" to form Roebeled strands 15a,b and 16a,b respectively, (see FIG. 1). Such "braided" Roebeled strands 15a,b and 16a,b have been shown to effectively neutralize energy-wasting eddy currents which would otherwise flow freely through the strand array 3. Unfortunately, the twisted, overlapping geometry of such Roebeled strands 15a,b and 16a,b forms a number of irregular regions 18a,b,c on the top and bottoms ends 13,14 of the strand array 3. It is difficult for the insulating epoxy material which forms the bulk of the insulative wall structure 7 to completely fill these regions 18a,b,c without the formation of air bubbles which create void spaces. However, before the problems associated with the formation of such void spaces can be fully appreciated, a more specific understanding of both the structure and the assembly of all the insulating materials between and around the strands 4 of the array 3 is necessary.

With reference again to FIG. 1, the individual strands 4 of the coil 1 are insulated from each other by paper-thin insulative sheets 20, which may be formed from thin glass cloth that has been impregnated with an insulating, epoxy resin. These layers 20 may be thin because even though the voltage conducted through the coil 1 may be as high as 24 kv, the voltage between individual adjacent strands 4 is only about 5 volts, being caused only by the impedance of the individual coil strand 4 as the current makes its way through the coil 1. By contrast, the difference in potential between the strands 4 of the coil 1 and ground is on the order of 20 kv. Accordingly, much heavier insulation in the form of the previously mentioned insulative wall structure 7 surrounds the entire strand array 3. This wall structure 7 generally comprises an inner insulating layer 26 formed from layers of epoxy impregnated Dacron ® felt which are applied over the top and bottom ends 13,14 of the strand array 3, and a ground wall 27 formed from an insulating layer 26 of micatape impregnated with epoxy and disposed over the layer 26 of felt and completely around the strand array 3 as shown, and an outer conductive layer 29 formed from conductive paint. In these manufacture of the prior art insulative wall structure 7, tape-like strips of insulating Mica impregnated with epoxy 28 are wrapped all around the strand array 3 after the layer 26 of epoxy-impregnated Dacron ® felt has been applied over the top and bottoms ends 13,14 of the strand array 3, and the entire coil section 1 is then simultaneously heated and compressed by means of a heatable press assembly (not shown) which brings the epoxy material in both the layers 26, 28 to above their fusing temperature, and finally to their curing temperature. To complete the wall structure 7, a layer of conductive point or varnish is applied over the outer surface of hardened epoxy and mica layer 28 to finish the ground wall 27.

While the simultaneous liquefication and compression of the material that ultimately forms the inner insulating 26 does much to eliminate void spaces in the irregular regions 18a,b,c presented by the over-lapping Roebeled strands 15a,b and 16a,b, it unfortunately does not eliminate all such void spaces. Accordingly, even under carefully controlled manufacturing conditions, the failure of the liquefied and compressed epoxy resin to fill all of the irregular spaces on the top and bottom ends 13,14 of the coil array 3 can result in a significant manufacturing rejection rate of all such coil sections made.

Figure 3:
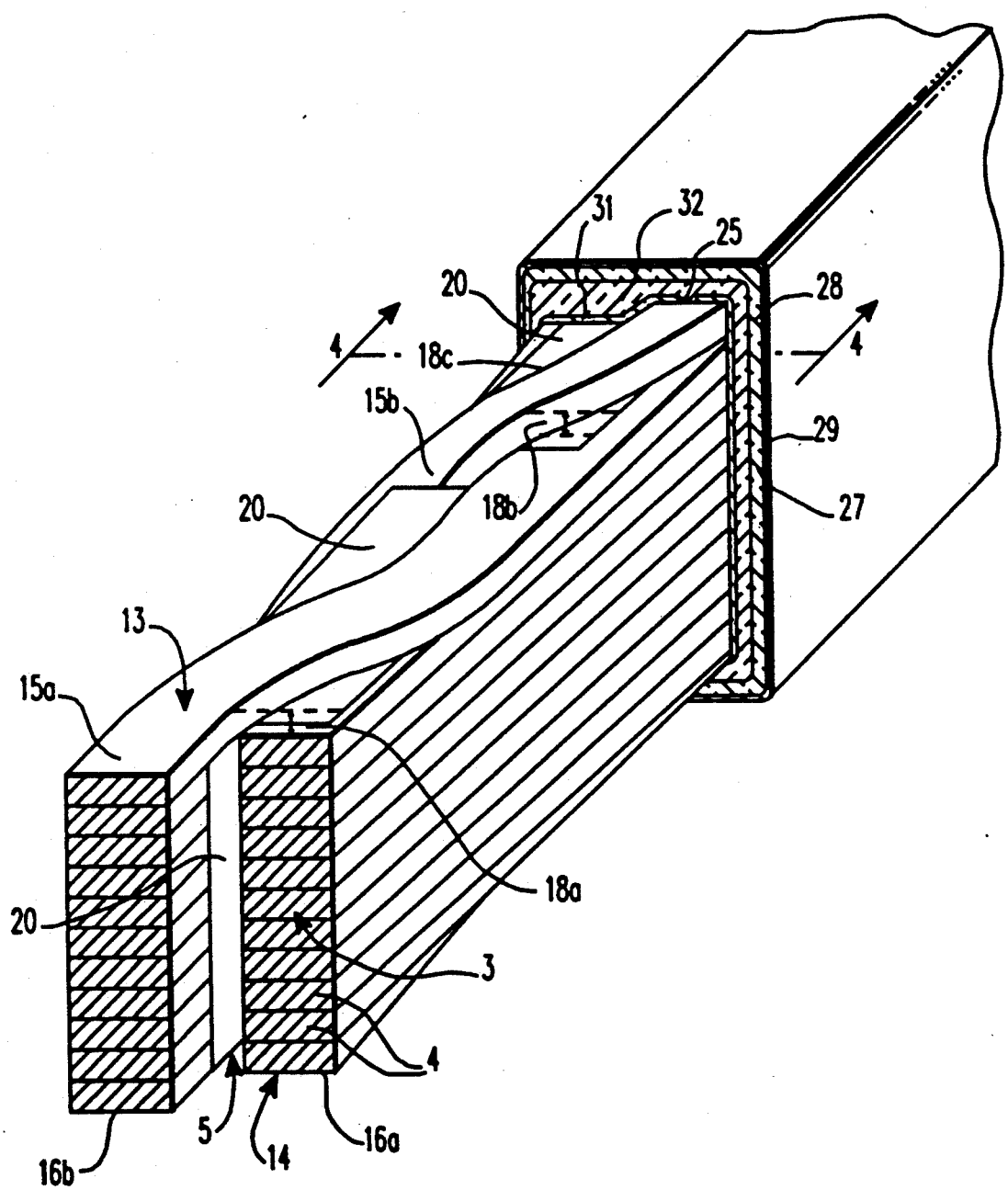
FIG. 3 is a perspective view of a coil section having Roebeled strands on its top and bottom ends that are insulated by the wall structure of the invention.

FIG. 3 illustrates the insulating wall structure 30 of the invention. Like the previously discussed prior art, the wall structure 30 of the invention includes an inner, insulating layer 31 formed from a nonconductive thermosettable epoxy material that is generally capable of filling the irregular spaces 18a,b,c formed by the Roebeled strands 15a,b and 16a,b. In the preferred embodiment, layer 31 is formed from a combination of mica paper and B stage epoxy. However, unlike the prior art wall structure 7, this structure 30 includes a semiconductive layer 32 between the inner insulating layer 31, and the ground wall 27. In the preferred embodiment, the semiconductive layer 32 is formed from a paste of carbon-filled epoxy material which may be fused into and hence structurally integrated with the nonconductive epoxy material forming the inner insulating layer 31 when the wall structure 30 is manufactured by the simultaneous application of heat and pressure thereto. The resulting integrality of the layers 31 and 32 not only provides the same kind of structural integrity associated with the prior art wall structure 7; it further helps to prevent the formation of any additional void spaces between the two layers 31 and 32. As is indicated in FIG. 3, the exterior surface of the semiconductive layer is covered by means of a ground wall 27 which is identical in structure to the ground wall 27 discussed with respect to the prior art.

In the preferred embodiment, the resistivity of the semi-conductive layer 32 is chosen to be low enough so that the electric stress across the insulating layer 31 is substantially lessened, but yet high enough so that no unwanted short circuiting is likely to occur between individual strands in the array 3. Accordingly, when the voltage applied through the array 3 of coil strands is on the order of 20 to 25 kilovolts, the resistance of the semiconductive layer 32 is chosen to be somewhere between 5,000 and 50,000 ohms per square, and more preferably between about 8,000 and 20,000 ohms per square. Also in the preferred embodiment, the semiconductive layer is between 0.3 and 0.6 in thickness.

In order to virtually eliminate any electric stress applied to the insulating layer 31, the semiconductive layer 32 of the insulative wall structure 30 of the invention may be electrically connected to one of the strands 15a,b or 16a,b on either the top or bottom end 13,14 of the strand array 3 by means of a connection interface 35. Structurally, this connection interface 35 is merely an opening in the insulative filler material forming the inner insulating layer 31 through which the semiconducting epoxy resin that forms the semi-conducting layer 32 may penetrate when the epoxy materials forming both the layers 31 and 32 are simultaneously subjected to both heat and pressure. When such a connection interface 35 is incorporated within the insulative wall structure 30 of the invention, the total electrical potential experienced within the insulating layer 31 is considerably lowered, as will be discussed in more detail with respect to FIG. 7. When such a connection interface 35 is used in connection with the insulative wall structure 7 of the invention, the resistance of the material forming the semiconductive layer 32 is preferably higher than the resistance of this layer when no such connection interface 35 is provided. Specifically, this resistance should be about 10,000 ohms without the interface 35, but raised up to a level of about 40,000 ohms per square when such an interface 35 is provided.

Figure 5:
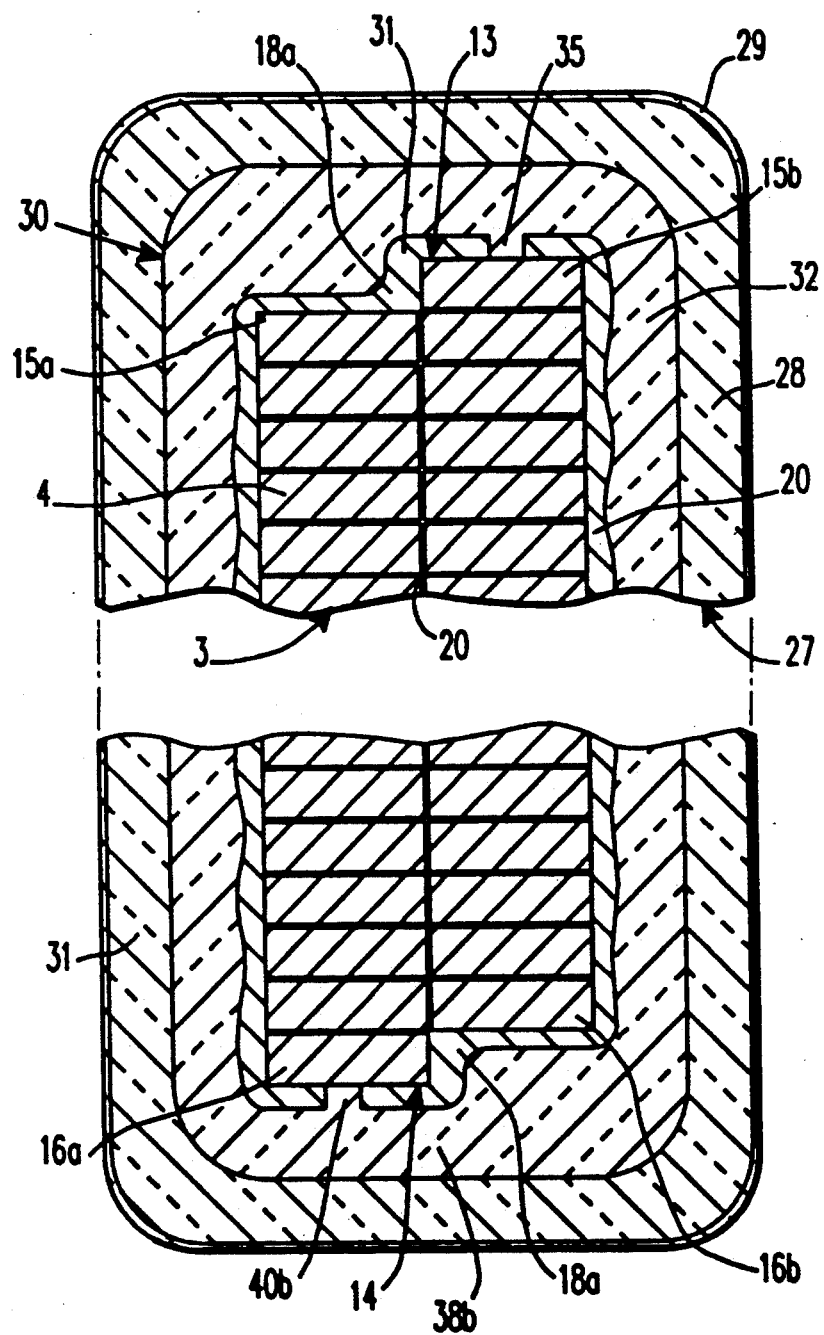
FIG. 5 is a cross-sectional view of a coil section insulated by means of an alternate embodiment of the invention, wherein the semiconductive layer does not entirely circumscribe the array of coil strands, but only covers the top and bottom ends of the strand array.

FIG. 5 illustrates an alternate embodiment of the insulative wall structure 30 of the invention, wherein the semiconductive layer is broken up into two layers 38a,b which cover only the top and bottoms ends 13,14 of the coil array 3. Because the insulating layer 31 completely isolates the Roebeled strands 15a,b on the top end 13 of the array 3 from the Roebeled strands 16a,b on the bottom end 14 of the array 3, two connection interfaces 40a,b may be provided which separately connect each of the semiconductive layers 38a,b to the coil array 3. This particular embodiment of the invention advantageously provides somewhat better insulation around the high voltage coil section 1 as a whole, since the sides of the strand array 3 are completely covered in insulating filler material formed from the inner insulating layer 31 and the inner layer 28 of the ground wall 27. However, because of the lack of semiconductive material in the side regions, the electric stress in the sides will not be reduced to the level that they are with respect to the first embodiment of the invention illustrated in FIG. 3. But this is only a small disadvantage, as most all of the void regions which might occur in the insulating material will occur at the top and bottom ends 13,14 of the strand array 3, as these are the areas of the array 3 characterized by discontinuous surfaces.

FIGS. 6A and 6B are schematic diagrams illustrating the theory of operation of the invention. Specifically, FIG. 6A represents how the ground wall 27 and inner insulating layer 26 of the prior art wall structure 7 essentially forms two series-connected capacitors wherein the electrodes of the upper capacitor are formed by the conductive paint layer 29 and the interface between the mica and epoxy layer 28 of the ground wall and the semiconductor layer 32, and the electrodes of the lower capacitor are formed by the interface between the aforementioned layers 28 and 32, and the surface of the strand array 3. The electric stress experienced by the insulating material forming the layer 25 is directly proportional to the reactance of the insulative wall structure 7, which in turn is inversely proportional to the capacitance of the capacitor schematically illustrated in FIG. 6A. If we are to lower this reactance, then we must increase the capacitance of the insulative wall structure surrounding the strand array 3. FIG. 6B illustrates how this capacitance is indeed increased by the presence of the semiconductive layer 32 in the insulative wall structure 30 of the invention. The conductive ability of the semiconductive layer 32 effectively reduces the distance between the capacitor plates formed by the surface of the strand array 3, and the interface between the layer 28 and 32. Moreover, at least with respect to the FIG. 3 embodiment of the invention, the area of the plates 3 and 29 is increased, as the stress is no longer located at only the top and bottom ends 13,14 of the strand array 3, but now encompasses all sides of the strand array 3 due to the fact that the semiconductive layer completely surrounds the array 3. This effective increase in capacitor plate size, coupled with the decrease in the distance between the plates raises the capacitance (and hence lowers the reactance of the insulative wall structure 30) in accordance with the well known relationship of $C=kA/d$, where k is the dielectric constant, A is the area of the capacitor plates and d equals the distance between the plates.

Figure 4:
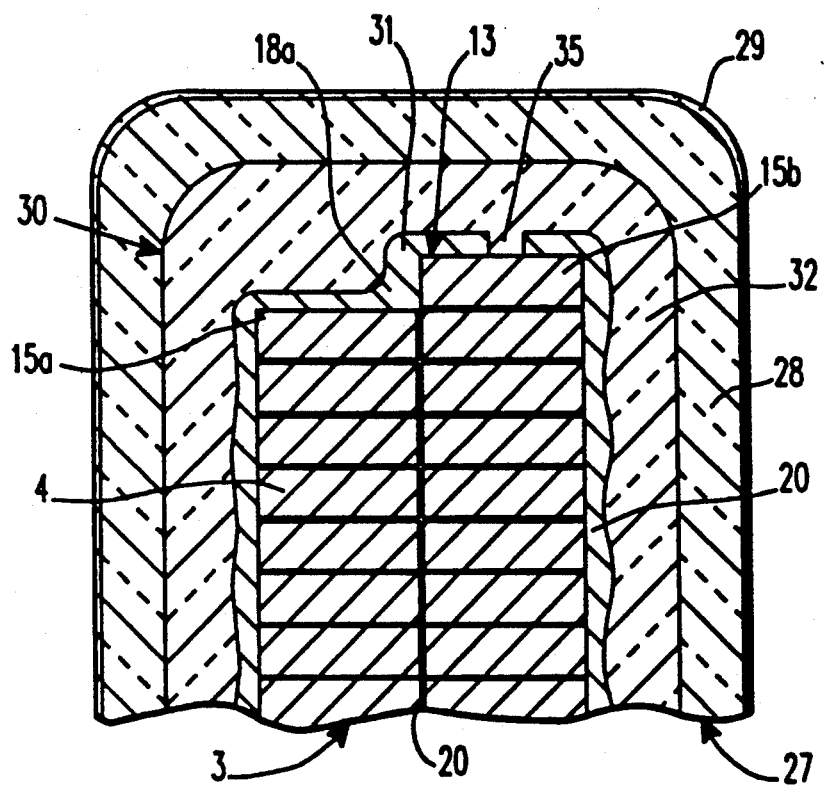
FIG. 4 is a partial cross-sectional view of the coil illustrated in FIG. 3 along the line 4—4, illustrating both the semiconductive layer and the connective interface between this layer and the top coil strand of the coil section.

FIG. 7 is a graph that compares the relative ability of the prior art insulative wall 7 to the ability of the insulative wall 30 of the invention in reducing electric stress through the wall. The abscissa of this graph represents a quantity known as "tangent delta", which is proportional to the amount of current losses which occur in a coil section 1 as a result of unwanted arcing within the insulative wall which covers the coil strands, while the ordinate of the graph represents electric potential in kilovolts. Dashed graph A represents how tangent delta increases over voltage with a prior art insulative wall structure 7, while solid line graph B illustrates how tangent delta increases with voltage for either of the two embodiments of the invention illustrated in FIGS. 4 and 5. A brief comparison of these graphs will show that not only is the tangent delta (and hence the electric stress) much lower for the insulative wall 30 of the invention; the slope of the increase of this electric stress in the 20-24 kilovolt region is also far less in the insulative wall structure 30 of the invention. Solid line graph C illustrates how tangent delta increases with applied voltage for an embodiment of the invention which includes the semiconductive layer 31, but which does not include any connection interfaces 35,40a,b between an individual strand 4 of the strand array 3, and the semiconductive layer 31. While the electric stress is not significantly lower at 20 kilovolts, it is important to note that this stress actually slopes slightly negatively in the critical region between 20 and 24 kilovolts for such an embodiment of the invention, while the slope for a prior art insulative wall structure 7 increases at almost a 45 degree angle.

I claim:

1. An improved wall structure for insulating an exterior surface of a high voltage component operated at between 20 and 25 kilovolts, comprising an insulating inner layer formed from a nonconductive epoxy material having a resistance of between 5,000 and 50,000 ohms disposed over the exterior surface per square of said component, an outer layer of material for grounding the wall structure, and a layer of semiconductive material for reducing electric stress across the insulating inner layer.

2. An improved wall structure as defined in claim 1, wherein said layer of semiconductive material is disposed between said outer layer and said insulating inner layer.

3. An improved wall structure as defined in claim 1, further comprising a connection means between said high voltage component and said layer of semiconductive material to further lower the electric stress between said component and said insulating inner layer.

4. An improved wall structure as defined in claim 1, wherein said high voltage component includes a plurality of conductors operated at different voltage levels, and further comprising a connection means between one of said plurality of said conductors and said layer of semiconductive material to further lower the electric stress between said component and said insulating inner layer.

5. An improved wall structure as defined in claim 1, wherein said semiconductive material has a resistance of between about 8,000 and 20,000 ohms per square.

6. An improved wall structure as defined in claim 1, wherein said insulating inner layer and said layer of semiconductive material are formed from hardenable, mutually integratable materials.

7. An improved wall structure as defined in claim 1, wherein said insulating inner layer and said layer of semiconductive material are formed from epoxy based materials that are mutually moldable into a single wall structure.

8. An improved wall structure as defined in claim 1, wherein said insulating inner layer is formed from a hardenable material for substantially filling void spaces present on the exterior surface of said high voltage component to avoid formation of arc-inducing air voids in said insulating inner layer.

9. An improved wall structure as defined in claim 1, wherein said high voltage component includes Roebeled windings on its outer surface.

10. A wall structure for insulating an exterior surface of a high voltage component having an irregular outer surface, comprising:
   an inner insulating layer formed from a hardenable filler material for filling void spaces created on the exterior surface of said component as a result of said irregular outer surface;
   an outer insulating layer surrounding said inner insulating layer;
   a semiconductive layer disposed between said inner and outer insulating layers for reducing electric stress across the inner insulating layer and in particular across any voids remaining after the hardenable material forming said inner insulating layer has been applied over the exterior surface of said component;
   wherein said semiconductive layer is between about 0.3 and 0.6 cm in thickness, and said component is a coil operated at between 20 and 25 kV.

11. A wall structure as defined in claim 10, further comprising a connection means between said high voltage component and said semiconductive layer to further lower the electric stress across said inner insulating layer.

12. A wall structure as defined in claim 10, wherein said high voltage component includes a plurality of conductors operated at different voltage levels, and further comprising a connection means between one of said plurality of said conductors and said semiconductive layer to further lower the electric stress across said inner insulating layer.

13. A wall structure as defined in claim 10, wherein said semiconductive layer has a resistance of between about 8,000 and 20,000 ohms per square.

14. A wall structure as defined in claim 13, wherein said semiconductive layer has a resistance of about 10,000 ohms per square.

15. A wall structure as defined in claim 10, wherein said semiconductive layer is formed from a hardenable material that is integrally moldable into the exterior surface of the inner insulating layer.

16. A wall structure as defined in claim 10, wherein said high voltage component includes Roebeled windings on its outer surface.

17. A wall structure as defined in claim 15, wherein said inner insulative layer is formed from non-conductive epoxy material, and said semiconductive layer is formed from carbon filled epoxy integrally molded onto said exterior surface of the inner insulative layer.

* * * * *

UNITED STATES PATENT AND TRADEMARK OFFICE
CERTIFICATE OF CORRECTION

PATENT NO. : 5,175,396

DATED : December 29, 1992

INVENTOR(S) : Franklin T. Emery; Leonard B. Simmonds

It is certified that error appears in the above-identified patent and that said Letters Patent is hereby corrected as shown below: On the title page:

The inventor's name "Emil M. Fort, Maitland, FL" was not included on the printed patent.

Signed and Sealed this

Twenty-third Day of November, 1993

Attest:

BRUCE LEHMAN

*Attesting Officer*      *Commissioner of Patents and Trademarks*